M. G. TENNENT.
WHEEL RIM.
APPLICATION FILED AUG. 24, 1916.

1,269,879.

Patented June 18, 1918.

WITNESS
O. Johnson

INVENTOR
Melvin G. Tennent
BY
C. D. Haskins
ATTORNEY

UNITED STATES PATENT OFFICE.

MELVIN G. TENNENT, OF SEDRO-WOOLLEY, WASHINGTON.

WHEEL-RIM.

1,269,879.  Specification of Letters Patent.  Patented June 18, 1918.

Application filed August 24, 1916. Serial No. 117,373.

*To all whom it may concern:*

Be it known that I, MELVIN G. TENNENT, citizen of the United States, residing at Sedro-Woolley, in the county of Skagit and State of Washington, have invented a certain new and useful Improvement in Wheel-Rims, of which the following is a specification.

My invention relates to a wheel-rim for vehicle wheels, and the object of my invention is to provide a wheel-rim with its tire mounted thereon and adapted to be so disposed to encircle the felly of a vehicle wheel (as, for instance, an automobile wheel) that it may quickly be removed from said felly and as quickly remounted thereon in the operation of repairing or changing its tire.

Figure 1:
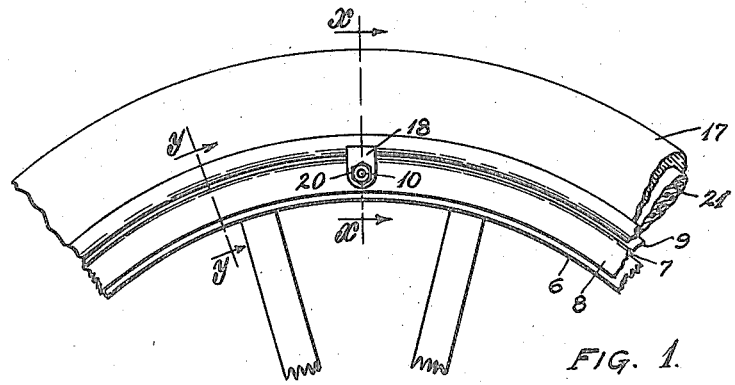
Figures 2, 3:
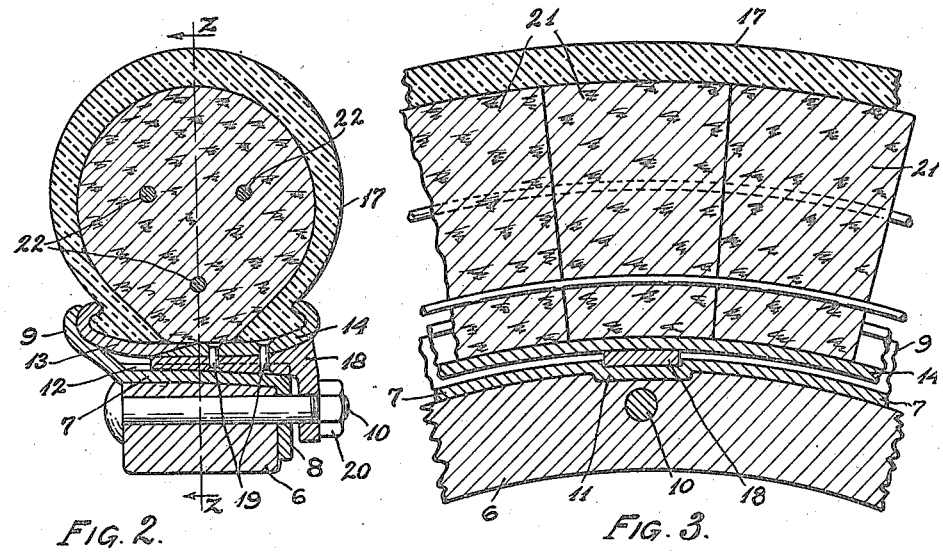
Figure 4:
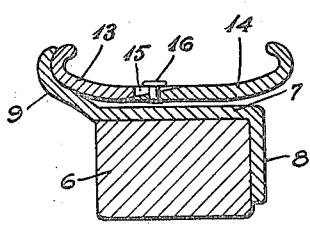

I accomplish these objects by devices illustrated in the accompanying drawings wherein Figure 1 is a view in side elevation of a segment of a vehicle wheel which embodies my invention; Fig. 2 is an enlarged view of the same in radial section on broken line $x, x$ of Fig. 1; Fig. 3 is a sectional view of the same on broken line $z, z$ of Fig. 2; Fig. 4 is a view of parts of the same in radial section on broken line $y, y$ of Fig. 1; and Fig. 5 is a view of the periphery of a fragment of associated parts of the wheel-rim of the same.

Referring to the drawings, throughout which like reference numerals indicate like parts, 6 designates the felly of a vehicle whose periphery is surrounded by a permanently fixed metal band 7 which is provided on one of its side edges with an integral, annular and inwardly projecting flange 8 that engages with one side surface of the felly 6, and which is further provided on its other side edge with an integral flange 9 that projects obliquely outward for a distance thence in a curve backwardly toward the plane of the wheel, as more clearly indicated in Figs. 2 and 4.

Extending through the felly 6 at equidistant points thereof, from one side surface to and through the other side surface thereof and through the flange 8, are a plurality of bolts, like bolt 10, and at a point opposite each of the bolts 10, only one of which is shown, the periphery of the metal band 7 is provided with a transversely disposed and inwardly projecting offset portion 11 which fits into a transverse recess formed in the periphery of the felly 6, as shown more clearly in Fig. 3, which offset portion 11 forms a transversely disposed recess in the periphery of the metal band 7.

Figure 5:
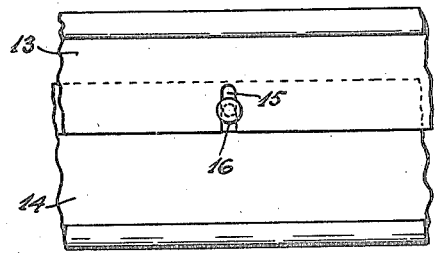

Disposed to encircle the metal band 7 is a wheel-rim comprising two separable portions 13 and 14 whose abutting edges are chamfered to adapt them to make a sort of telescopic joint, and at different points around the portion 13 its chamfered abutting edge is provided with a narrow transverse slot 15 which is adapted to receive and guide a correspondingly disposed stud 16 which is fixed in the chamfered abutting edge of the portion 14, as shown more clearly in Figs. 2, 4 and 5.

The outer edges of the portions 13 and 14 of the wheel-rim are both curved upwardly and inwardly to engage with and hold the opposite flanged edges of a hollow vulcanized rubber tire 17, of well known form, as shown more clearly in Fig. 2.

The underside of the outer edge portion of the portion 14 of the wheel-rim is formed and disposed to fit within and be supported by the curved portion of the flange 9 of the metal band 7, while the portion 14 of said wheel-rim is provided with a plurality of transversely disposed angular brackets 18 secured to its side surface by rivets, as rivets 19 shown in Fig. 2, arms of which brackets 18 are disposed to project toward the hub of the wheel in a plane adjacent to the outer side of the annular flange 8.

Each of the brackets 18 is disposed to adapt it to register with a different one of the bolts 10 so that such bolt 10 may project its screw-threaded end portion through a hole formed in the arm of said bracket, as shown in Fig. 2, whereby when the nuts of said bolts 10, as the nut 20 shown in Figs. 1 and 2, are turned in a clockwise direction, then the brackets 18 and the portion 14 to which they are attached will be forced to move toward the flange 9 of the metal band 7 to cause the chamfered edge of said portion 14 to engage with the chamfered edge of the portion 13 to force such portion 13 against the curved edge of the flange 9, the brackets 18 being guided by the transverse side walls of the respective ones of the transverse recesses 12 in the periphery of the metal band 7 within which recesses 12 respective ones of said brackets 18 are disposed to fit.

Thus the brackets 18 serve to support the portion 14 of the wheel-rim, while the flange 9 serves to support the portion 13 thereof, Obviously, the brackets 18 may be fastened to the underside of the portion 14 by electrically welding them thereto instead of riveting them by the rivets 19.

If it be desired to remove the wheel-rim from the wheel, such operation may be effected quickly by simply removing the nuts 20 from the bolts 10 whereupon the portion 14 may be withdrawn from the periphery of the metal band 7 to release the portion 13 which then may also be withdrawn from the wheel and the members 13 and 14 being thus separated will permit the removal of the hollow vulcanized rubber tire 17 in an obvious manner.

Within the hollow vulcanized rubber tire 17 is disposed a core of any suitably elastic and light yielding material which wholly fills the circular space therewithin, thus to give resiliency to the tire, said core comprising abutting disks 21 strung upon three wires 22, as shown in Figs. 2 and 3.

Said disks 21 may be made of a composition of granulated cork and adhesive material, as rubber cement, and molding such composition into the required form of disks to make a resilient filling for said tire 17, or, they may be made of any other suitably resilient material.

Obviously, changes may be made in the forms, dimensions and arrangement of parts of my invention without departing from the spirit thereof.

What I claim is:

A wheel rim of the class described including an annular band permanently secured upon the periphery of a wheel felly and having an outwardly extending integral flange on one side forming a seat for a removable wheel rim section and an inwardly extending flange at the opposite side engaging the adjacent side of the felly, said band being provided with a plurality of spaced transverse peripheral depressions, a removable wheel rim including two separable telescopically joined annular sections, a plurality of spaced transversely disposed angular brackets secured on the inner face of one of the rim sections, one arm of each of which brackets is provided with a bolt hole and projects inwardly from one side of said section toward the axis thereof and lies parallel with the adjacent side of the felly, said wheel rim being disposed to encircle said metal band with one of its sections seated on the outwardly extending integral flange of the band, said angular brackets being partially seated in the peripheral depressions of said band to space the wheel rim from the band, and bolts extending through the wheel felly, the inwardly extending band flange and said brackets to hold one section of said wheel rim in its telescopic engagement with the other section thereof, and to confine said section thereof in its seat on the integral flange of said band.

In witness whereof I hereunto subscribe my name this 14th day of August, A. D. 1916.

MELVIN G. TENNENT.

Witnesses:
FRANK WARREN,
O. JOHNSON.